United States Patent [19]
Koritala

[11] 4,174,300
[45] Nov. 13, 1979

[54] PREPARATION OF HIGHLY ACTIVE COPPER-SILICA CATALYSTS
[75] Inventor: Sambasivarao Koritala, Peoria, Ill.
[73] Assignee: The United States of America, as represented by the Secretary of Agriculture, Washington, D.C.
[21] Appl. No.: 873,572
[22] Filed: Jan. 30, 1978
[51] Int. Cl.$^2$ ............................................. B01J 29/00
[52] U.S. Cl. .................................................. 252/454
[58] Field of Search ........................................ 252/454
[56] References Cited
U.S. PATENT DOCUMENTS

| 2,783,286 | 2/1957 | Reynolds | 252/454 X |
| 2,939,844 | 6/1960 | Ellinger | 252/454 X |
| 3,278,568 | 10/1966 | Jonge et al. | 252/454 X |
| 3,515,678 | 6/1970 | Koritala | 252/432 |
| 3,749,681 | 7/1973 | Koritala | 252/438 |

OTHER PUBLICATIONS

Selective Hydrogenation of Soybean Oil, III Copper-exchanged Molecular Silver and Other Supported Catalyst, JAOCS 45(3): 197–200, 1968.

Primary Examiner—Delbert E. Gantz
Assistant Examiner—William G. Wright
Attorney, Agent, or Firm—M. Howard Silverstein; David G. McConnell; Curtis P. Ribando

[57] ABSTRACT

Highly active and selective linolenate-reducing, copper catalysts are prepared by vacuum drying copper-silica coprecipitates, and then activating the precipitates by heat treatment. The resultant catalysts are characterized by activities 2-3.5 times those of commercial copper chromites and also possess comparable linolenate selectivities.

6 Claims, No Drawings

PREPARATION OF HIGHLY ACTIVE COPPER-SILICA CATALYSTS

BACKGROUND OF THE INVENTION

1. Field of the Invention

This invention relates to copper catalysts useful for the selective hydrogenation of the linolenate moiety of polyunsaturated vegetable oil.

2. Description of the Prior Art

It is frequently desirable to reduce the triunsaturated linolenic component of vegetable oils to a more saturated state. For example, soybean oil contains 6 to 9% of the linolenic moiety, which is suspected of causing flavor reversion. The stability of soybean oil as it relates to flavor could be vastly improved by eliminating the linolenate from the oil. This is preferably accomplished by hydrogenating it to the nutritionally desirable linoleic moiety.

Nickel catalysts currently used for the hydrogenation are highly active but also nonselective. That is, they simultaneously reduce both the linolenic and the linoleic components at a relative rate of about 2:1.

Commercially available copper-chromites are by far more selective than the nickel catalysts in that they reduce the linolenic moiety at 10-15 times the rate of linoleic reduction. However, commercial copper-chromites are not as active as the nickel catalysts, and are therefore uneconomical to use.

It is generally known in the prior art that the activity of catalysts can be increased by supporting them on high surface area supports, such as the silica gels taught in U.S. Pat. Nos. 3,515,678 and 3,749,681. These gels are generally manufactured by first acidifying sodium silicate to precipitate it. The precipitate is then aged under carefully controlled conditions to aggregate the molecules. These aggregates are subsequently washed, formed by specialized procedures into the desired shape, and dried. The gel properties are particularly influenced by the precipitation and aging conditions. Most procedures for manufacturing silica gel are proprietary and usually expensive. Therefore, despite the superior activity over the copper-chromites, the advantage of catalysts supported on such gels is negated by the prohibitive cost of the special supports.

An attempt to substitute sodium silicate for the costly silica gel support is taught by Koritala [JAOCS 45(3): 197-200 (1968)]. The sodium silicate was precipitated from aqueous solution with approximately an equal molar amount of copper nitrate. Neither the activity nor the selectivity was comparable to the supported catalysts, and it was generally unacceptable for commercial use.

SUMMARY OF THE INVENTION

I have now discovered a method for preparing a highly active and selective linolenate-reducing, copper catalyst without the need for expensive supports comprising the following steps:

a. reacting sodium silicate from an aqueous solution with a water-soluble copper salt to form a precipitate;

b. recovering said precipitate from said aqueous solution;

c. vacuum drying said recovered precipitate from step (b); and d. heat treating said vacuum-dried precipitate from step (c) at a temperature in the range of 350°-625° C. to yield said catalyst.

The coprecipitated catalysts prepared by this method are characterized by an activity of 2-3.5 times that of the commercial copper chromites and up to twice that of the coprecipitated copper-silicate catalysts heretofore prepared by Koritala, supra. The instant catalysts are also characterized by linolenate selectivity comparable to the copper-chromites and copper-on-silica-gel, and 30-40% higher than Koritala's copper-silicate. They also require approximately 1/20 the quantity of sodium silicate needed to manufacture a comparable copper-on-silica-gel catalyst.

DETAILED DESCRIPTION OF THE INVENTION

In the preparation of the novel catalysts, the copper source may be any water-soluble copper salt, such as the nitrate, sulfate, chloride, and acetate. Copper nitrate and other salts having anionic moieties nonpoisonous to the catalysts are preferred in the event that residual amounts of the anion remain with the isolated catalyst. Commercially available copper nitrates such as those used in the accompanying examples are frequently hydrated, though it is not intended that the instant disclosure be limited to such.

Likewise any water-soluble sodium silicate may be used without limitation to any particular degree of hydration. Exemplary of such are $Na_2SiO_3.5H_2O$, $Na_2SiO_3$, $Na_2O.xSiO_2$ where $x=3-5$, $Na_2Si_2O_5$, $NaSiO_3.9H_2O$, $Na_4SiO_4$, and the like.

The ratio of copper to silica may vary from the supported catalyst range, defined as being 0.5-10 g. of copper per 100 g. of silica, to the unsupported range having more than 10 g. of copper per 100 g. of silica. While supported catalysts are generally more efficient, they are often more expensive and difficult to prepare and require neutralization of the excess anionic moiety. For this reason it is advantageous to coprecipitate equal molar amounts of copper and silicate.

Coprecipitation is normally effected by the dropwise addition of aqueous copper nitrate to an aqueous solution of sodium silicate. Reverse addition of sodium silicate to copper nitrate is also operable, but usually results in a slight loss of catalytic activity. Highest activities are obtained by conducting the precipitation between 25° and 55° C., though temperatures anywhere in the range of 0°-100° C. will yield catalytic activities superior to those of copper-chromite.

Residual sodium ions from the sodium silicate are poisonous to the catalyst. It is therefore necessary to recover the copper-silica precipitate from the aqueous solution. The recovery may include any conventional washing procedure as known in the art.

The critical step which distinguishes this method from that taught by Koritala, supra, relates to the specific technique of drying the catalyst precipitate. It was unexpectedly discovered that by substituting a vacuum-type drying for conventional oven drying, that both the activity and the linolenate selectivity could be substantially increased. The most active catalysts are obtained be freeze drying; that is, when the precipitate is frozen prior to applying the vacuum. However, satisfactory results are obtained when the wet precipitate is initially at room temperature.

Activation of the dried catalysts is effected by heat treatment at a temperature in the range of about 350°–625° C. Outside of this range, the activity is significantly diminished. While the specific duration of the heat treatment is not critical, 1–3 hours is generally sufficient. The preferred heat treatment is conducted for 2 hours at 425°–575° C. with best results obtained at 500° C.

The instant copper-silica catalysts are useful for the selective hydrogenation of soybean oil and other vegetable oils having a triunsaturated linolenate moiety. The oils are preferably refined and bleached to insure the absence of contaminants which would poison the catalyst. The selectivity ratio (K) is defined as the relationship $K = K_{Le}/K_{Lo}$, which is the ratio of the rate of reaction of linolenate ($K_{Le}$) over that of linoleate ($K_{Lo}$). K values of the instant catalysts range from 13–14. The activity is measured in terms of time of hydrogenation for a given quantity of oil and copper and for a given set of temperature and pressure conditions of hydrogenation. For 270 g. of soybean oil and 0.26 g. of copper at 170° C., and a hydrogen pressure of 30 p.s.i.g., the novel catalysts are characterized by activities ranging from about 17 to 41 minutes.

The following examples are intended only to further illustrate the invention and are not intended to limit the scope of the invention defined by the claims.

EXAMPLES 1–7

A. Catalyst Preparation.

Five grams (0.0207 mole) of copper nitrate [Cu(NO$_3$)$_2$·3H$_2$O] in 25 ml. distilled water was added dropwise to 50 ml. of a well-stirred solution of 4.388 g. (0.0207 mole) of sodium silicate at a selected temperature. The resultant copper-silica precipitate was washed three times by stirring in 400 ml. distilled water each time and removing the supernatant by centrifugation. The washed precipitate was then suspended in 100 ml. of distilled water, frozen, and then freeze dried by drawing a vacuum on the frozen precipitate. This yielded approximately 3.3 g. copper-silica catalyst. A portion of this was activated by heating at a selected temperature for 2 hours and then used for hydrogenation. The temperatures of precipitation and activation and the results of hydrogenation are given in the table below.

B. Hydrogenation.

Refined, bleached soybean oil (free fatty acids 0.9%) was obtained from a commercial source. It was rerefined with a theoretical amount of sodium hydroxide and then bleached with 0.5% "Super Filtrol" at 105°–110° C. under 0.5 mm. vacuum. The rerefined and bleached oil had a free fatty acid content of 0.01% and was used to test the hydrogenation properties of the catalysts. All hydrogenations were carried out in a Parr apparatus equipped with a gas dispersion agitator running at 1700 r.p.m. The soybean oil (270 g.) and the catalyst (0.26 g. copper) were added to the autoclave, flushed with nitrogen, and heated to 170° C. The bomb was evacuated, flushed with hydrogen, and then filled with hydrogen to 30 p.s.i.g. The agitator was turned on to start the reaction. Hydrogen pressure inside the reactor was maintained constant at 30 p.s.i.g. by introducing hydrogen from an external reservoir tank through a pressure regulator valve. The extent of reaction was measured from the drop in pressure in the external reservoir tank. After the desired amount of reaction, the stirrer was turned off and the bomb was cooled. The oil was separated from the catalyst by filtration through "Celite."

Analyses of the hydrogenation products were determined from the fatty acid methyl esters prepared from the triglycerides by transesterification with sodium methoxide catalyst. The percentage isolated trans was measured by infrared absorption at 10.36 µm. and by comparison with methyl elaidate standard. Diene conjugation and percent linolenate were determined by the Official AOCS Method Cd-7-58 described in "Official and Tentative Methods of the American Oil Chemists' Society," Vol. I, Third Edition, AOCS (1964). Fatty acid composition was computed from gas-liquid chromatography and spectrophotometric analyses. From the composition of the initial and hydrogenated soybean oils, selectivity ($K_{Le}/K_{Lo}$) was determined with a digital computer.

EXAMPLE 8

The catalyst preparation and hydrogenation procedures of Examples 1–7 were substantially repeated with the exception that the sodium silicate solution was added to the copper nitrate solution. The results are shown in the table.

EXAMPLE 9

The catalyst preparation and hydrogenation procedures of Examples 1–7 were substantially repeated with the exception that the precipitate was not freeze dried, but simply vacuum dried at an initial temperature of 25° C. The results are given in the table.

EXAMPLE 10

This example represents the prior art procedure of Koritala, supra. The catalyst preparation and hydrogenation procedures of Examples 1–7 were substantially repeated with the exception that conventional oven drying at 110° C. was substituted for the freeze drying. The results are given in the table.

EXAMPLE 11

This was designed to be a control wherein the hydrogenation of Examples 1–7 was substantially repeated with the exception that a commercial copper-chromite catalyst was substituted for the copper-silica catalysts of the invention. The results are shown in the table.

It is understood that the foregoing detailed description is given merely by way of illustration and that modification and variations may be made therein without departing from the spirit and scope of the invention.

Table

| Example | Precipitation temp. (°C.) | Method of drying | Activation temp. (°C.) | Hydrogenation time (min.) | Iodine value drop | Linolenate (%) | Diene conjugation (%) | trans (%) | Selectivity $K_{Le}/K_{Lo}$ | Relative catalyst activity[a] |
|---|---|---|---|---|---|---|---|---|---|---|
| 1 | 25 | freeze dried | 500 | 17 | 15.2 | 0.8 | 1.8 | 9 | 13 | 3.36 |
| 2 | 55 | freeze dried | 500 | 17 | 15.4 | 0.7 | 1.8 | 8 | 14 | 3.41 |
| 3 | 0 | freeze dried | 500 | 29 | 15.0 | 0.9 | 1.6 | 8 | 13 | 1.94 |

Table-continued

| Example | Precipitation temp. (°C.) | Method of drying | Activation temp. (°C.) | Hydrogenation time (min.) | Iodine value drop | Linolenate (%) | Diene conjugation (%) | trans (%) | Selectivity $K_{Lc}/K_{Lo}$ | Relative catalyst activity[a] |
|---|---|---|---|---|---|---|---|---|---|---|
| 4 | 100 | freeze dried | 500 | 41 | 14.7 | 0.9 | 1.5 | 8 | 13 | 1.35 |
| 5 | 25 | freeze dried | 425 | 20 | 15.5 | 0.8 | 1.7 | 8 | 13 | 2.91 |
| 6 | 25 | freeze dried | 575 | 19 | 15.5 | 0.7 | 1.7 | 9 | 14 | 3.07 |
| 7 | 25 | freeze dried | 350 | 30 | 15.0 | 0.9 | 1.2 | 8 | 13 | 1.88 |
| 8 | 25[b] | freeze dried | 500 | 22 | 14.9 | 0.9 | 1.7 | 8 | 13 | 2.55 |
| 9 | 25 | vacuum dried (25° C.) | 500 | 23 | 14.7 | 1.0 | 1.7 | 9 | 13 | 2.40 |
| 10 | 25 | oven dried (110° C.) | 500 | 35 | 15.6 | 1.2 | 1.5 | 9 | 10 | 1.68 |
| 11 | commercial copper-chromite | | | 59 | 15.7 | 0.6 | 1.3 | 10 | 14 | 1.00 |

[a]Iodine value drop/minute relative to commercial copper-chromite catalyst (Example 11).
[b]Reverse addition (sodium silicate solution added to copper nitrate solution).

I claim:

1. In a method for preparing highly active and selective linolenate-reducing, copper-silica catalysts including the steps of:
   a. reacting sodium silicate from an aqueous solution with a water-soluble copper salt to form a precipitate;
   b. recovering said precipitate from said aqueous solution;
   c. drying said recovered precipitate from step (b); and
   d. heat treating said dried precipitate from step (c) at a temperature in the range of 350°-625° C. to yield said catalyst,
   the improvement comprising conducting said drying in step (c) under a vacuum at room temperature or less.

2. The method as described in claim 1 wherein said copper salt in step (a) is copper nitrate.

3. The method as described in claim 1 wherein in step (c) said precipitate is at room temperature at the beginning of said vacuum drying.

4. The method as described in claim 1 wherein in step (c) said precipitate is in a frozen state at the beginning of said vacuum drying.

5. The method as described in claim 1 wherein in step (d) said heat treating is conducted for 2 hours at 425°-575° C.

6. The copper catalyst produced by the process of claim 1.

* * * * *